United States Patent [19]
Tsunoda et al.

[11] 3,928,045
[45] Dec. 23, 1975

[54] AUTOMATIC COOKING AND VENDING MACHINE FOR BOILED NOODLES

[75] Inventors: Tatsui Tsunoda, Kobe; Santaro Oka, Nishinomiya; Kazuma Miyamoto, Kobe; Makoto Matsumoto, Kobe; Heiji Baba, Kobe, all of Japan

[73] Assignee: Kawatetsu Metrological Equipment and Vending Machine Company, Ltd., Nishinomiya, Japan

[22] Filed: Feb. 7, 1975

[21] Appl. No.: 547,789

[52] U.S. Cl. .................. 99/330; 99/334; 99/345; 99/356; 99/357; 99/359; 99/443 R; 220/367; 221/75; 221/150 HC; 426/113; 426/403; 426/523; 229/43

[51] Int. Cl.² .................................. A47J 27/18

[58] Field of Search ............ 99/330, 334, 345, 352, 99/356, 357, 359, 407, 443 R; 221/75, 150 HC; 220/367; 229/43; 426/394, 396, 113, 403, 523

[56] References Cited
UNITED STATES PATENTS

| | | | |
|---|---|---|---|
| 2,642,328 | 6/1953 | Nystedt | 221/75 |
| 3,139,343 | 6/1964 | Baselt | 99/359 X |
| 3,332,338 | 7/1967 | Wein | 99/330 |
| 3,425,339 | 2/1969 | Fleischman et al. | 99/357 |
| 3,448,677 | 6/1969 | Dexters | 221/150 HC |
| 3,788,302 | 1/1974 | Malaney et al. | 99/330 |
| 3,866,795 | 2/1975 | Urano | 221/150 HC |

*Primary Examiner*—Billy J. Wilhite
*Attorney, Agent, or Firm*—Silverman & Cass, Ltd.

[57] ABSTRACT

An automatic cooking and vending machine for boiled noodles is disclosed which comprises a casing composed of a refrigeration chamber and a cooking chamber. The refrigeration chamber is kept at a temperature of 5°C to 10°C and can deliver a number of containers each containing a bunch of boiled noodles one by one to the cooking chamber. The cooking chamber encloses therein a pivotally mounted cooking table on which is disposed the container delivered from the refrigeration chamber. The container is capable of receiving hot water at a temperature higher than 70°C, removing it, simultaneously receiving hot water and broth, delivering through a window provided in the front wall of the cooking chamber to a small table from which customers can pick up the container and appreciate the boiled noodles flavored with the broth.

1 Claim, 8 Drawing Figures

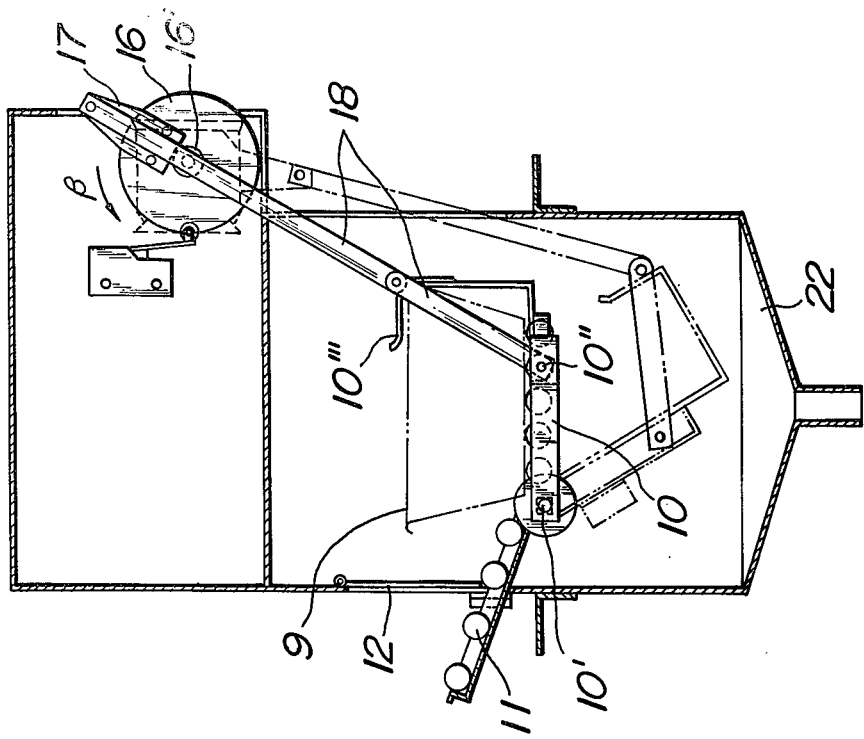
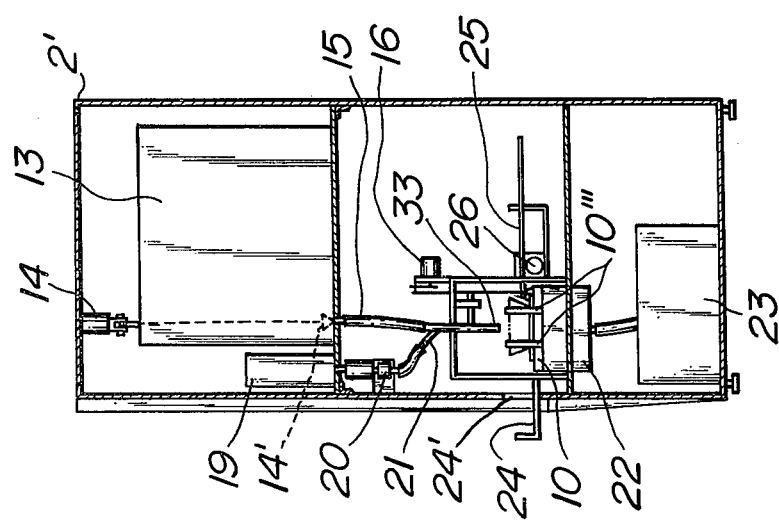

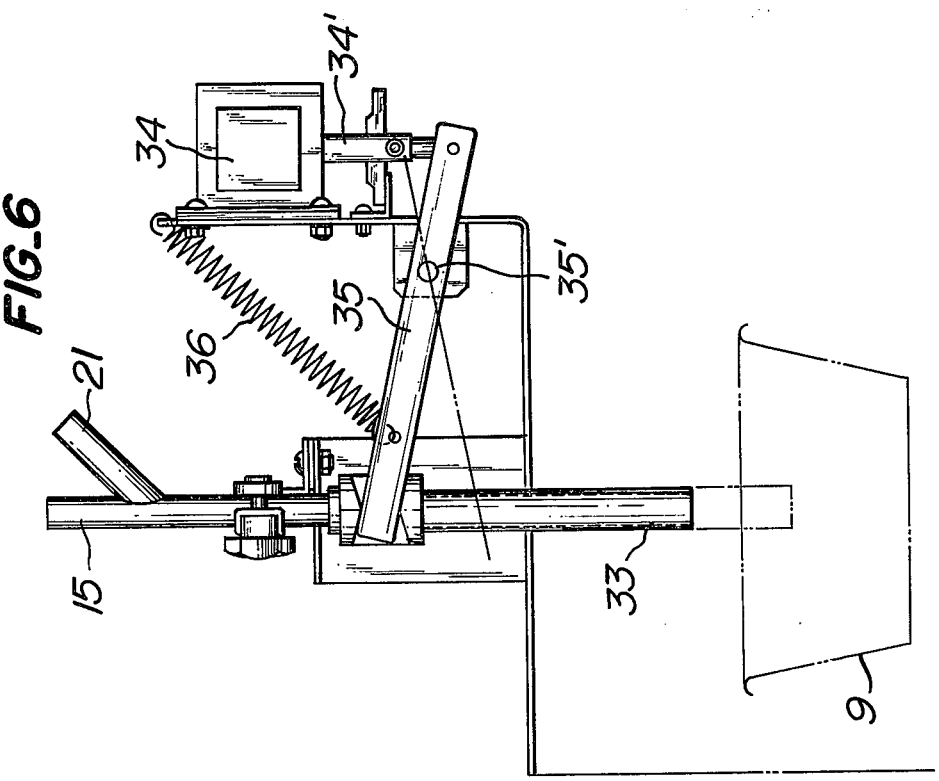
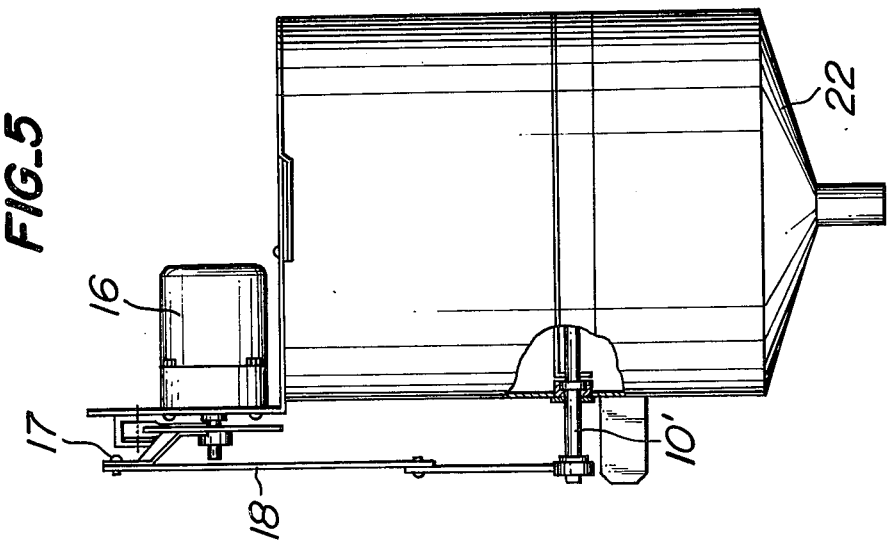

AUTOMATIC COOKING AND VENDING MACHINE FOR BOILED NOODLES

This invention relates to an automatic cooking and vending machine which can serve delicious boiled noodles flavored with broth which is added with or without fried fishes, eggs and the like.

Boiled noodles such as boiled wheat vermicelli, buckwheat vermicelli and the like flavored with broth which is added with or without fried fishes, eggs and the like are nutritious and very important food suited for Japanese people. The boiled noodles have heretofore been manually cooked by a skilled cook and served in a bowl. This cook and service require many manual treating steps.

An automatic cooking and vending machine for boiled noodles has, heretofore, been taken into consideration owing to the recent lack of man power. But, since there is no way of supplying boiled noodles which are agreeable to one's taste under sterile and sanitary condition, such kind of automatic cooking and vending machine has not yet been used in practice.

In general, boiled noodles are rinsed with hot water and after removal of the hot water a bunch of rinsed noodles is put into a bowl into which is added broth which is added with or without fried fishes or eggs.

The boiled noodles thus cooked are agreeable to one's taste immediately after removal from the hot water and simultaneously added with the hot water and broth. If the boiled noodles are left in hot state for a long time, the boiled noodles not only varnish their flavor but also become too swollen to satisfy one's taste.

As a result, in order to automatically cook the boiled noodles, it is nesessary to develop technique which can supply hot water and remove it after the hot water has sufficiently heated the boiled noodles and which can simultaneously supply hot water and broth within a short time.

The boiled noodles are easy to get spoiled so that they must be preserved at a temperature of 5°C to 10°C.

As a result, it is difficult to sufficiently heat the boiled noodles in a short time. It might be conceived that hot water is poured into a container containing boiled noodles therein. The use of such measure ensures an elevation of temperature of the boiled noodles preserved at a temperature of 5°C to 10°C to at most 50°C which could not sufficiently heat the boiled noodles. In addition in order to provide an automatic cooking and vending machine, there is a difficult problem of arranging a number of containers each containing a bunch of boiled noodles in a refrigeration chamber and delivering from the refrigeration chamber these containers one by one to a cooking table where the above mentioned cooking is carried out.

The above described difficulties arising in the case of cooking and vending the boiled noodles have heretofore not been solved, and as a result, and atuomatic cooking and vending machine for boiled noodles has never been used in practice.

An object of the invention is to provide an automatic cooking and vending machine for boiled noodles which can solve the above mentioned difficulties encountered in the prior art technique and which can deliver delicious bunch of boiled noodles flavored with broth which is added with or without fried fishes, eggs and the like and can serve in a container even at cold winter midnight without necessitating attendance of a cook.

The invention will now be described in greater detail with reference to the accompanying drawings, wherein:

FIG. 2 is a section on line II—II of FIG. 1;

FIG. 4 is an enlarged vertical longitudinal section taken through the lower part of the cooking chamber shown in FIG. 1;

FIG. 5 is a front elevation of the lower part of the cooking chamber shown in FIG. 4;

FIG. 6 is an enlarged front elevation of the hot water and broth pouring means diagrammatically shown in FIG. 1;

Figure 1:
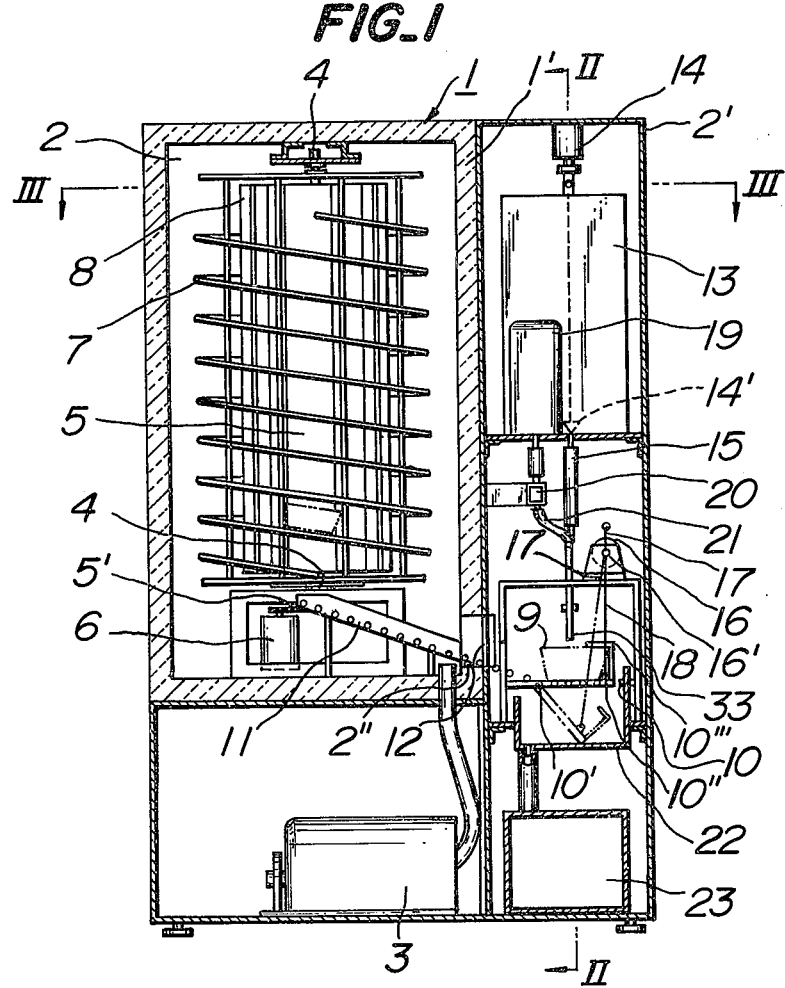
FIG. 1 is a vertical longitudinal sectional view showing an automatic cooking and vending machine for delivering a number of bunches of boiled noodles one by one according to the invention.

Referring to FIG. 1, an automatic cooking and vending machine comprises a casing 1 composed of a refrigeration chamber 2 and a cooking chamber 2' arranged side by side and made integral with each other through a partition wall 1'.

The refrigeration chamber 2 is kept at a low temperature of 5°C to 10°C which is useful for preserving boiled noodles by means of a refrigerator 3.

Figure 3:
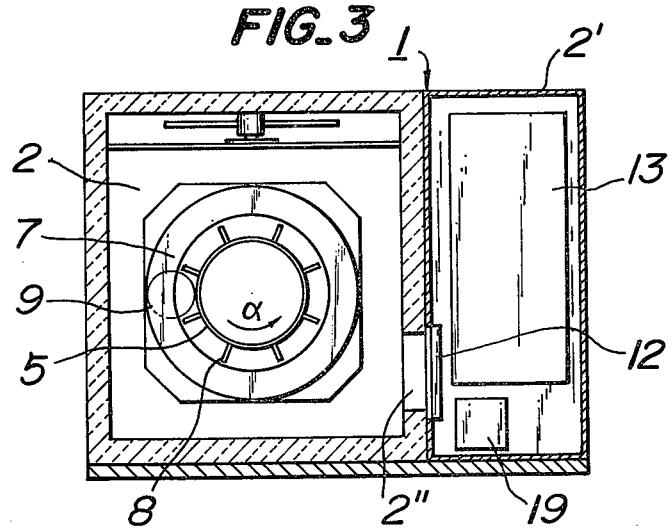
FIG. 3 is a section on line III—III of FIG. 1.

The refrigeration chamber 2 is provided at its ceiling and bottom with rotary shafts 4, 4, respectively, for rotatably supporting a drum 5 having a plurality of radially and axially extending blades 8 secured at their bases to the periphery of the drum 5 and spaced equidistantly apart from each other as shown in FIG. 3. The drum 5 is adapted to be rotated through an endless belt 5' by a driving step motor 6 for 360°/n (n is number of the blades 8). The step driving motor 6 becomes operated through a microswitch (not shown) when an instruction signal is supplied thereto, for example, a coin is thrown into the vending machine.

Around the free ends of the radial blades 8 is arranged a stationary spiral chute 7 which is spirally extended along the vertical drum 5. A number of containers 9 each containing a bunch of boiled noodles are sandwiched between two adjacent radial blades 8, 8 on the one hand and the spiral chute 7 on the other hand throughout the overall length of the drum 5, one of the containers 9 being shown by dot and dash lines in FIGS. 1 and 3. When the driving step motor 6 becomes operated to rotate the drum 5 by one step, the container 9 at the lower outlet end of the spiral chute 7 is pushed out of its.

Between the lower outlet end of the spiral chute 7 and a cooking table 10 is spanned an inclined guide member 11 consisting of a roller conveyor and extending through an opening 2" provided at the lower end of the partition wall 1' of the casing 1 up to the cooking table 10. One of the containers 9 pushed out of the lower end of the spiral chute 7 is slipped down the inclined guide member 11 and causes a door 12 which normally closes the opening 2" to open and is disposed on the cooking table 10.

Directly above the cooking table 10 is arranged a hot water tank 13 which is provided therein with a heater such as an electric heater or gas heater and the like (not shown) and is ready to supply hot water.

The hot water tank 13 is provided at its upper end with a solenoid 14 which is adapted to be energized when the container 9 is disposed on the cooking table 10 and open a normally closed valve 14', thereby pouring hot water kept at a temperature higher than 60°C through a supply pipe 15 into the container 9.

The amount of hot water poured into the container 9 is controlled by means of a conventional timer (not shown) which can define the opening time of the normally closed hot water supply valve 14' such that the bunch of boiled noodles in the container 9 can sufficiently be heated by the hot water.

The cooking talbe 10 is pivoted at its one end 10' to the machine frame and connected at its another end 10'' through links 18 and a crank arm 17 to a rotary shaft 16' of a motor 16. The motor 16 is provided with means for stopping the motor 16 when it has completed its one revolution.

After the hot water has been poured into the container 9, the cooking table 10 is rotated about its pivot 10' in a clockwise direction to a position shown by dot and dash lines in FIGS. 1 and 4 and then returned to its original position shown by a full line.

As a result, the hot water poured into the container 9 is removed out of the container 9. Heating and rinsing of the bunch of boiled noodles contained in the container 9 are effected during the hot water is remained in the container 9. Reference numeral 10''' designates a holder for preventing the container 9 from becoming upside down when the container 9 is inclined and for holding the container 9 in its upright position after the container 9 has returned to its original position.

Near the hot water tank 13 is arranged a broth tank 19 containing a concentrated broth of dried bonito or chicken and communciated through a supply pipe 21 provided with a conventional electromagnetic valve 20 with the hot water supply pipe 15. When the motor 16 is stopped and the container 9 is returned to its upright position, the electromagnetic valve 20 becomes opened and the broth in the tank 19 is poured through the supply pipes 21, 15 into the container 9. At the same time, the valve 14' provided for the hot water tank 13 becomes opened to supply the hot water through the supply pipe 15. As a result, the broth in the tank 19 and the hot water in the tank 13 are mixed in the lower portion of the supply pipe 15 and then the mixed liquid is poured into the container 9.

Just below the cooking table 10 is arranged a dish 22 adapted to collect the hot water removed from the container 9 and deliver it to a reservoir 23 or a sump pit (not shown).

Adjacent to the cooking table 10 is arranged a small table 24 projected outwardly from the cooking chamber 2' through a window 24' provided in the front wall of the cooking chamber 2' as shown in FIG. 2. The container 9 containing the hot boiled noodles and disposed on the cooking table 10 is pushed forwardly onto the small table 24 by means of a pushing rod 25 adapted to be reciprocated through a rack and gear means with the aid of a reversible motor 26.

The pushing rod 25 is then moved rearwardly and then stopped and becomes ready to move forwardly. The reversible motor 26 is controlled by a conventional microswitch or timer, etc., such that the reversible motor 26 is started when the electromagnetic valves 14', 20 are closed to stop supply of the hot water and concentrated broth.

A plurality of above described automatic cooking and vending machines may be interlocked in parallel with each other and different kinds of boiled noodles such as wheat vermicelli, buckwheat vermicelli, wheat vermicelli flat in section and the like may be supplied for vending, respectively.

Figure 7:
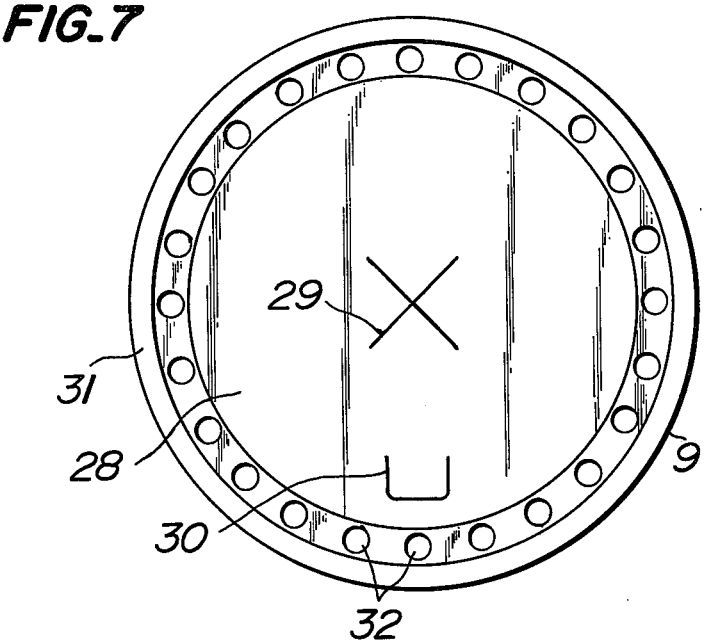
FIG. 7 is an enlarged plan view of the container shown in FIG. 1.
Figure 8:
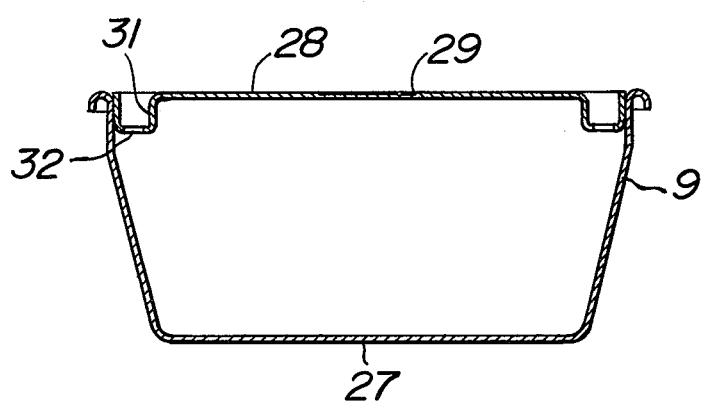
FIG. 8 is a vertical longitudinal section of the container shown in FIG. 7.

Provision may be made of means operable before or after supplying the broth to the container 9 to add fried fishes, fired beancurd, eggs and the like cooked and preserved beforehand to the container 9. Such means or the above mentioned automatic cooking and vending machines for supplying different kinds of boiled noddles may be interlocked with a count detection means adapted to selectively operate these means or machines when coins of different prices are thrown into the automatic cooking and vending machine.

in FIGS. 7 and 8 is shown a container 9 which is useful for preserving, rinsing and handling the boiled noodles.

The container 9 is composed of a bowl 27 and a lid 28 fitted in and closing the upper opening of the bowl 27. The lid 28 is provided at its center with an injection opening 29 through which the hot water and the broth are poured into the container 9 and near its periphery with a knob 30 for ease of removing the lid 28 from the bowl 27. In addition, the lid 28 is provided around its periphery with a groove 31 which is provided at its base with a number of outlet holes 32 through which is removed waste hot water. The dimension of these holes 32 is so determined that the bunch of boiled noodles contained in the bowl 27 could not be flown out therethrough when the container 9 is inclined to remove the waste hot water.

The lid 28 may preferably be made of soft synthetic resin. It is preferable to make the injection opening 29 cross-slit in shape. In the case of adding the fried fishes, fried beancurds, eggs onto the boiled noodles, the injection opening 29 is made so large that these additions may easily be passed therethrough.

As shown in FIG. 6, around the lower end of the supply pipe 15 is slidably fitted an injection pipe 33 which is connected through a lever 35 to an armature 34' adapted to be raised and lowered in response to energization and deenergization of a solenoid 34. If the solenoid 34 is energized, the lever 35 is rotated about a pivot 35' in a counter clockwise direction against a bias of a spring 36, thereby pushing the injection pipe 33 through the crossed slits 29 into the container 9 as shown by dot and dash lines in FIG. 6. The injection pipe 33 is returned to its original position by the action of the spring 36.

The automatic cooking and vending machine 1 constructed as above described will operate as follows.

If a coin is thrown into the machine, the driving step motor 6 is energized to rotate the blade carrying drum 5 in the refrigeration chamber 2 by one step in the direction shown by an arrow α in FIG. 3. The blades 8 cause one of the container 9 at the lower outlet end of the spiral chute 7 to ride on the inclined guide member 11. The container 9 is then slipped down the inclined guide member 11 to open the normally closed door 12 and disposed on the cooking table 10. Then, the solenoid 14 is energized to open the electromagnetic valve 14' in the hot water tank 13 and at the same time the solenoid 34 is also energized to push the injection pipe 33 through the cross-slit 29 into the container 9. As a result, a given amount of hot water is poured through the supply pipe 15 and the injection pipe 33 into the container 9.

The hot water in the container 9 causes boiled noodles enclosed therein to heat and rinse therewith. Subsequently, the motor 16 is energized to rotate the crank arm 17 in a counter clockwise direction in FIG. 4 so as to incline the cooking table 10 through the levers 18 to a position shown by dot and dash lines, thereby removing the hot water in the container 9 through its peripheral outlet openings 32 out of the bowl 27. After the hot water is delivered from the container 9 into the dish 22, the reversible motor 16 is rotated in an opposite direction to return the cooking table 10 to its original position.

Then, the electromagnetic valves 14', 20 become opened to supply both the hot water in the hot water tank 13 and the broth in the broth tank 19 through the supply pipes 21, 15 and the injection pipe 33 into the container 9.

As a result, it is possible to heat, rinse and swell the boiled noodles contained in the container 9 with the hot water, remove the waste hot water, supply the concentrated broth diluted with the hot water, pushing the container 9 onto the small table 24 and vending it to customers.

As stated hereinbefore, the automatic cooking and vending machine according to the invention has a number of advantages. In the first place, a number of bunches of boiled noodles may be preserved in a refrigeration chamber until a bunch of boiled noodles is vended to customers so that one bunch of fresh boiled noodles may always be supplied without corrosion and modification thereof. Secondly, one bunch of boiled noodles is heated and rinsed with hot water in a closed cooking chamber so that it is possible to keep the boiled noodles sterile and sanitary and provide boiled noodles having a good taste in the mouth due to heat exchange between the boiled noodles and the hot water at a temperature higher than 60°. Third, the use of concentrated broth selected beforehand, of a mixing ratio of the concentrated broth with the hot water and of hot water whose amount is mechanically defined provides boiled noodles having optimum taste without requiring any skilled cook. Finally, hot boiled noodles may automatically be cooked and vended even at cold winter midnight without necessitating attendance of a cook.

What is claimed is:

1. An automatic cooking and vending machine for boiled noodles comprising a casing composed of a refrigeration chamber and a cooking chamber arranged side by side and made integral with each other through a partition wall, said refrigeration chamber being communicated with said cooking chamber through an opening provided at the lower part of said partition wall and normally closed by a door, a vertical rotary drum rotatably journaled in said refrigeration chamber and provided around its periphery with a plurality of radial blades extending along said rotary drum and equidistantly apart from each other, a driving step motor for rotating said drum in a stepwise manner, a stationary spiral chute surrounding said radial blades and extending along said rotary drum, a plurality of containers each containing a bunch of boiled noodles and disposed in a space defined by said radial blades and said spiral chute, each of said containers being provided at its lid with an injection opening, an inclined guide member having one end located directly below the lower outlet end of said spiral chute, a cooking table arranged in said cooking chamber and adapted to be inclined, means for inclining said cooking table and returning it into its original position, a hot water tank and a broth tank arranged above said cooking table and provided with respective supply pipes communicated at their lower ends with an injection pipe adapted to be raised and lowered and extended through said injection opening of said lid into said container, means for raising and lowering said injection pipe, and electromagnetic valves provided for said supply pipes of said hot water tank and broth tank, respectively, and adapted to open and close said supply pipe of said hot water tank and then simultaneously open both said supply pipes of said hot water tank and broth tank.

* * * * *